US005243820A

United States Patent [19]

Shimoura et al.

[11] Patent Number: 5,243,820

[45] Date of Patent: Sep. 14, 1993

[54] HYDRAULIC CIRCUIT WITH COMPENSATOR VALVE BIASED WITH HIGHEST PRESSURE ACTING ON ACTUATORS

[75] Inventors: Ken-ichi Shimoura; Kensuke Ioku, both of Kobe; Hiroaki Sakai, Kako, all of Japan

[73] Assignee: Nippon Air Brake Kabushiki Kaisha, Kobe, Japan

[21] Appl. No.: 717,003

[22] Filed: Jun. 18, 1991

[30] Foreign Application Priority Data

Jul. 11, 1990 [JP] Japan .......................... 2-183520

[51] Int. Cl.$^5$ .................. F16D 31/02; F15B 11/08; F15B 13/04

[52] U.S. Cl. .......................... 60/452; 60/426; 60/494; 91/445; 91/447; 91/517; 91/531

[58] Field of Search .............. 60/445, 450, 452, 459, 60/494, 426; 91/512, 517, 518, 531, 511, 445, 447, 446, 448

[56] References Cited

U.S. PATENT DOCUMENTS

| | | | |
|---|---|---|---|
| 3,559,534 | 2/1971 | Munro | 91/448 X |
| 3,693,506 | 9/1972 | McMillen et al. | 91/448 X |
| 4,051,868 | 10/1977 | Andersen | 91/446 X |
| 4,787,294 | 11/1988 | Bowden | 91/447 |
| 4,813,235 | 3/1989 | Miller | 60/445 X |
| 4,976,106 | 12/1990 | Noerskau et al. | 60/450 X |
| 5,005,358 | 4/1991 | Hirate et al. | 60/426 |
| 5,025,625 | 6/1991 | Morikawa | 91/517 X |
| 5,067,389 | 11/1991 | St. Germain | 91/446 |
| 5,077,972 | 1/1992 | Bianchetta et al. | 60/450 X |
| 5,101,629 | 4/1992 | Sugiyamo et al. | 91/447 X |
| 5,129,229 | 7/1992 | Nakamura et al. | 91/518 X |
| 5,146,747 | 9/1992 | Sugiyama et al. | 60/450 X |

FOREIGN PATENT DOCUMENTS

| | | | |
|---|---|---|---|
| 0167501 | 10/1982 | Japan | 60/445 |
| 60-11706 | 1/1985 | Japan . | |
| 2195745A | 4/1988 | United Kingdom . | |

*Primary Examiner*—Edward K. Look
*Assistant Examiner*—John Ryznic
*Attorney, Agent, or Firm*—Wegner, Cantor, Mueller & Player

[57] ABSTRACT

When a hydraulic circuit for driving actuators of a construction machine or the like includes a single hydraulic pump and a plurality of direction changeover valves connected to the hydraulic pump for controlling the respective actuators, operation of one of the direction changeover valves may result in undesirable change in the output oil pressure of the other direction changeover valves. The inventive hydraulic circuit includes means for driving a regulator of the hydraulic pump in response to any oil puressure change at the inlets of the direction changeover valves corresponding to the output oil pressure change, thereby compensating for the pressure change.

1 Claim, 4 Drawing Sheets

HYDRAULIC CIRCUIT WITH COMPENSATOR VALVE BIASED WITH HIGHEST PRESSURE ACTING ON ACTUATORS

BACKGROUND OF INVENTION

This invention relates to a hydraulic circuit used in construction machines, industrial vehicles and likes.

A typical example of such hydraulic circuit is disclosed in U.S. Pat. No. 4,693,272 and it will be described first with reference to FIGS. 1 and 2. As shown in the drawings, the circuit is arranged such that a plurality of direction changeover valves 54 connected with an actuator 53 are connected to the outlet of a pump 52 of variable discharge type whose discharge quantity varies with a pilot pressure acting to a regulator 51 and each direction changeover valve 54 is provided with a pressure compensation valve 55 and a shuttle valve 56 for selecting the maximum load pressure, thereby causing the load pressure selected by the shuttle valve 56 to act to the regulator 51 and a spring chamber 57 of the pressure compensation valve 55.

In operation of the above-mentioned hydraulic circuit, the shuttle valve 56 of each direction changeover valve 54 is connected through passages 59*a*, 59*b* and 59*c* of a spool 58 to a tank passage 60 when the spool 58 is in its neutral position as shown in FIG. 1. Accordingly, a tank pressure acts to the regulator 51 of the variable discharge pump 52 and, therefore, the pump 52 produces at its outlet an oil pressure responsive to a pressing force of a spring disposed in the regulator 51. Accordingly, in the state of FIG. 1, the circuit is held in such a condition that low pressure oil is confined within passages 61 and 62 of the direction changeover valve 54.

When the spool 58 of the direction changeover valve 54 is moved rightwards from the position as shown, the passage 59*a* is first closed by a slide hole of the spool 58 and a load passage 63 and a first supply passage 64 are connected with each other. With such connection of the load passage 63 and the first supply passage 64, the load pressure of the actuator 53 acting on the load passage 63 acts also on the first supply passage 64. This load pressure further acts through the shuttle valve 56, a high pressure selection passage 65 and a passage 68 to the regulator 51. Therefore, the variable discharge pump 52 delivers an oil pressure which is higher than the load pressure of the actuator 53 by an amount corresponding to the spring force in the regulator 51. If the spool 58 is moved further rightwards, the entrance passage 61 is connected to a second supply passage 67 through a metering iris 66 and, at this time, the oil pressure of the second supply passage 67 in the upstream side of the pressure compensation valve 55 becomes a pressure corresponding to the load pressure of the actuator 53 acting on the pressure compensation valve 55 since the load pressure of the actuator 53 has acted already through the high pressure selection passage 65 and the passage 68 to the spring chamber 57 of the pressure compensation valve 55. Accordingly, the pressure difference between the side of the entrance passage 61 (upstream side) and the side of the second supply passage 67 (downstream side) of the metering iris 66 becomes a pressure difference responsive to the spring force of the regulator 51. Therefore, the oil quantity passing the metering iris 66 becomes to have a value responsive to the aperture of the metering iris 66 (or the amount of movement of the spool 58).

While the above description has been made on the operation of the direction changeover valve as shown when its spool 58 is moved, similar operation will take place when a plurality of direction changeover valves are operated at the same time. More particularly, at this time, the highest one of the actuator loads connected to the respective direction changeover valves is selected and applied from the high pressure selection passage 65 through the passages 68 and 69 to the spring chamber 57 of the pressure compensation valve 55 of each direction changeover valve 54. Accordingly, the oil pressure difference between the upstream and downstream of the metering iris 66 of each direction changeover valve becomes a differential pressure responsive to the spring force of the regulator 51 and, therefore, the oil quantity passing each direction changeover valve has a value responsive to the amount of operation of each direction changeover valve.

When such hydraulic circuit is applied to an actuator of a construction or industrial machine, the variable discharge pump 52 which is used as its oil pressure source is generally driven by an engine and located near the engine. However, the direction changeover valve for feeding pressurized oil discharged from the pump to a plurality of actuators are often located far from the pump. Therefore, the outlet of the pump and the inlet of each direction changeover valve are connected through a hydraulic piping which produces a substantial pressure loss. Thus, there has been such a problem in that the pressure loss may affect the flow control function of each direction changeover valve and this problem will be described in more detail below.

When any of the direction changeover valves is operated in the above-mentioned hydraulic circuit, the load pressure of the operated actuator 53 acts on the regulator 51 of the variable discharge pump 52 to produce an oil pressure corresponding to the load pressure. As the pressurized oil is supplied through a piping to the direction changeover valve, the oil pressure of the supply passage of the direction changeover valve is lower than the oil pressure at the outlet of the variable discharge pump 52 by a value corresponding to the piping resistance. Accordingly, the pressure difference formed by the spool 58 of the direction changeover valve across the metering iris 66 becomes lower than a pressure corresponding to the spring force of the regulator 51 by the above-mentioned value corresponding to the piping resistance. The piping resistance increases with increase of the rate of flow therethrough and, therefore, if the aperture of the metering iris 66 increases, the pressure difference across the metering aris 66 will decrease correspondingly. Accordingly, it becomes impossible to control the flow rate in response to the movement of the spool 58. This problem may result in the following trouble, for example. When a plurality of direction changeover valves are operated at the same time and the amount of operation is constantly maintained, if the amount of operation of one of the direction changeover valves is increased (or decreased), the oil quantity flowing from the variable discharge pump to the direction changeover valve will increase (or decrease) correspondingly. Therefore, as described above, the piping resistance will increase (or decrease) to decrease (or increase) the pressure difference across the metering iris 66 of each direction changeover valve, thereby decreasing (or increasing) the flow rate. Accordingly, when two direction changeover valves are operated at the same time, the operation of one direction changeover valve may result in instantaneous reduction (or increase) of the speed of the actuator 53 connected to the other direction changeover valve.

Accordingly, an object of this invention is to solve the above-mentioned problem in the prior art and provide an improved hydraulic circuit which enables stable flow rate control.

SUMMARY OF INVENTION

This object can be attained by a hydraulic circuit according to this invention, which comprises a composite valve connected to the outlet of a hydraulic pump of variable discharge type and composed of a plurality of direction changeover valves having a spool for controlling direction and rate of flow of pressurized oil fed to an actuator. Each direction changeover valve comprises an entrance passage connecting with the outlet of the hydraulic pump, a first supply passage caused to connect with the actuator by the spool, a second supply passage connecting with the entrance passage through a metering iris formed by the spool, and a pressure compensation valve having a pressure chamber disposed between the first and second supply passages. The composite valve includes high pressure selecting means for selecting the highest one of the pressures in the first supply passages of the respective direction changeover valves to apply it to the pressure chambers of ther respective pressure compensation valves and apply a pressure depending upon the highest pressure to a regulator of the hydraulic pump.

As a feature of this invention, the hydraulic circuit further comprises a pressure reducing valve disposed between the inlet of the composite valve and an outlet of the hydraulic pump, and the pressure reducing valve is provided with a spring chamber subjected to the oil pressure of the regulator or the hydraulic pump and a pressure chamber subjected to the oil pressure of the entrance passages of the composite valve, thereby maintaining the oil pressure of the entrance passages of the composite valve higher than the oil pressure of the regulator of the hydraulic pump by a valve corresponding to the spring force of the spring chamber.

As another feature of this invention, the regulator of the hydraulic pump includes a spring chamber subjected to a pressure depending upon the highest pressure and a pilot chamber opposed thereto and the pilot chamber is connected to the entrance passages of the composite valve.

These objects and features of this invention will be described in more detail below in conjunction with its preferred embodiments with reference to the accompanying drawings.

DESCRIPTION OF PREFERRED EMBODIMENTS

Figure 1:
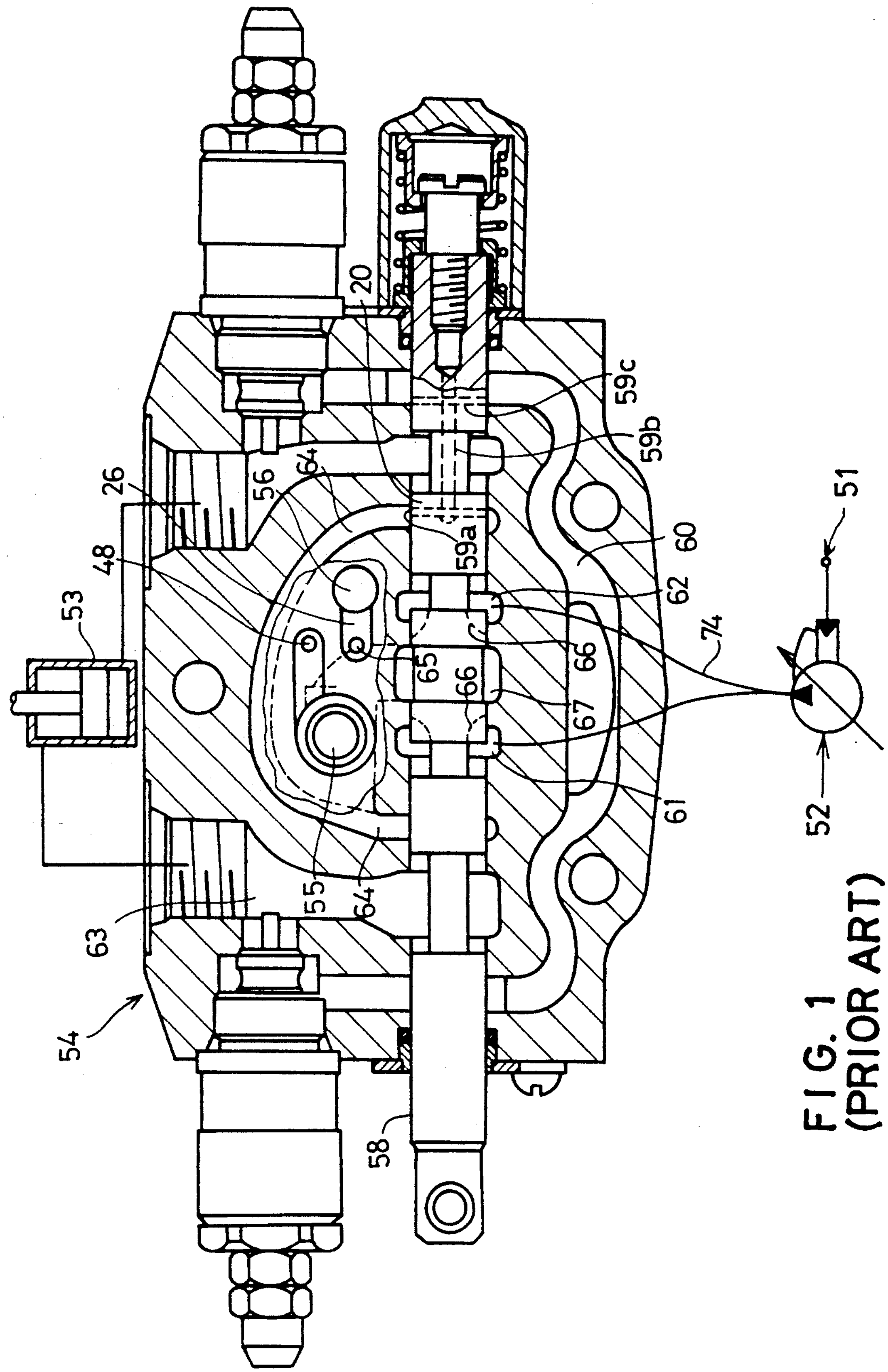
FIG. 1 (PRIOR ART)
FIG. 1 is a partly sectional side view of a composite valve used in the prior art hydraulic circuit.
Figure 2:
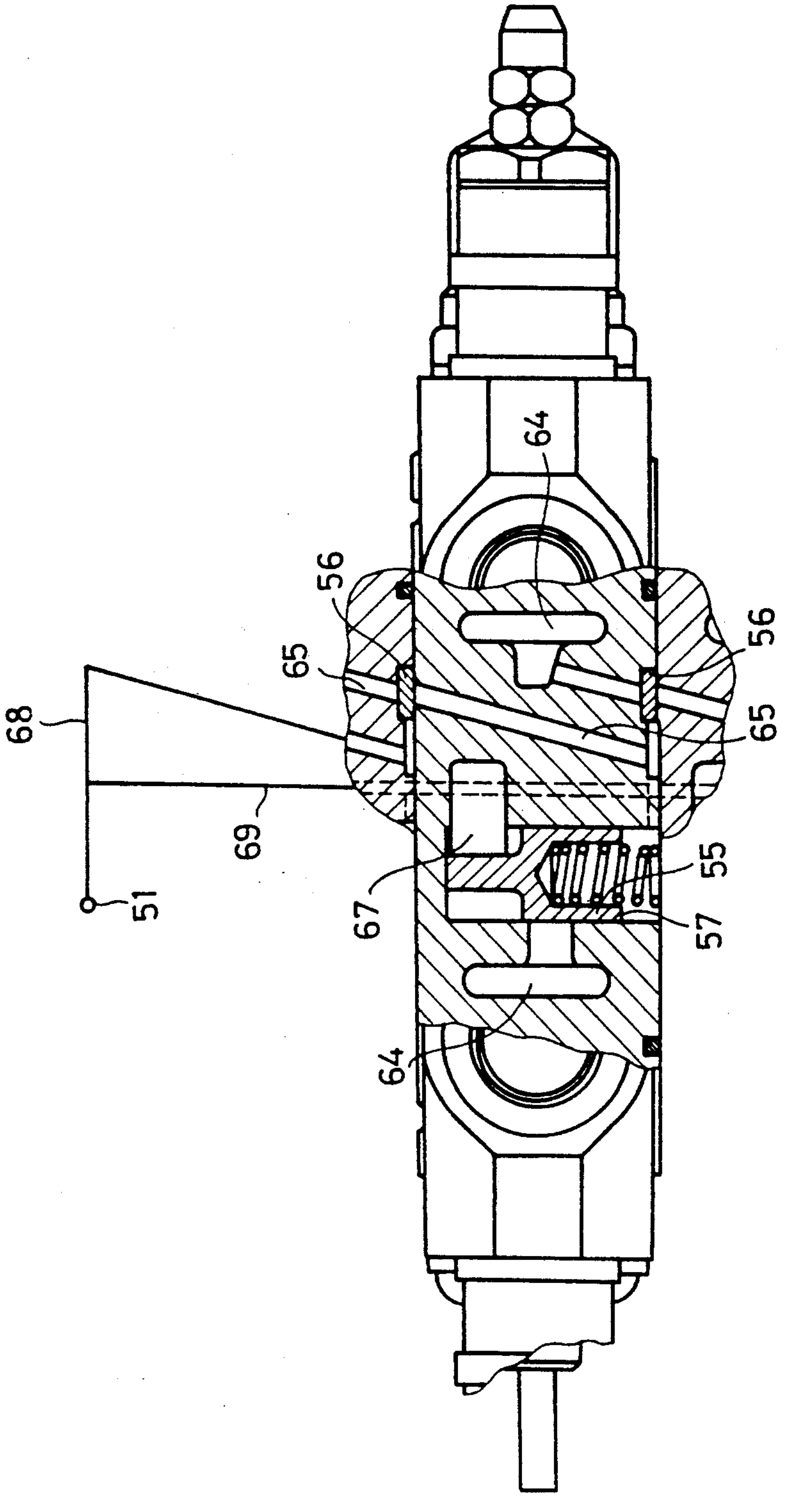
F I G. 2 (PRIOR ART)
FIG. 2 is a partly sectional plan view of the composite valve of FIG. 1.
Figure 3:
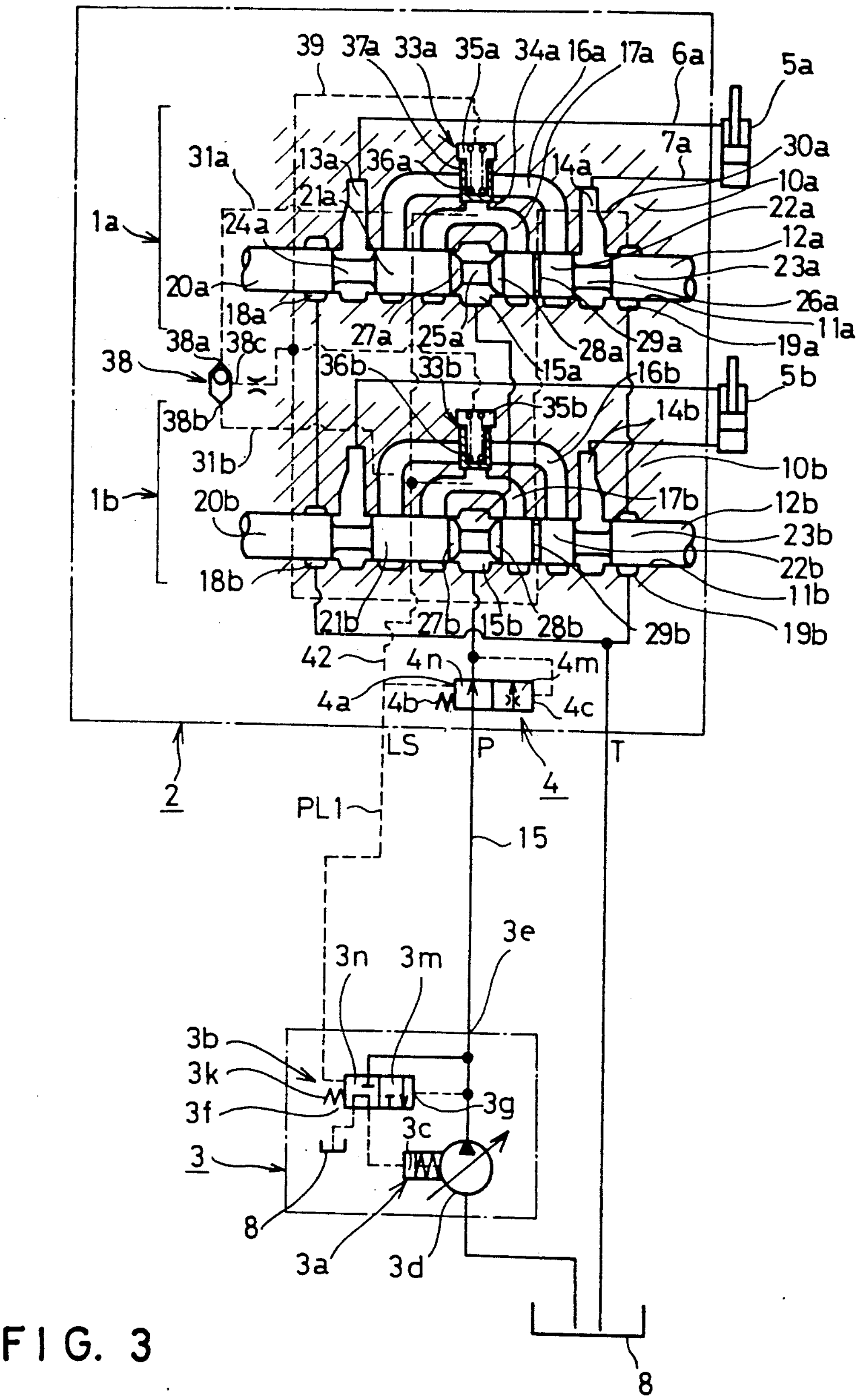
FIG. 3 is a schematic diagram showing an embodiment of the hydraulic circuit according to this invention.

In the first embodiment shown in FIG. 3, a composite valve 2 is composed of a pair of direction changeover valves 1*a* and 1*b* having the same structure and a pressure reducing valve 4 and disposed between a hydraulic pump 3 of variable discharge type and a pair of actuators 5*a* and 5*b*. Due to the same structure, the structural components of the direction changeover valves 1*a* and 1*b* are expressed by the same numerals suffixing "a" and "b", respectively, and the description will be made mainly about the first direction changeover valve 1*a*.

The direction changeover valve 1*a* includes a main body 10*a* having a plurality of internal passages and a spool 12*a* having major diameter portions 20*a*, 21*a*, 22*a* and 23*a*, minor diameter portions 24*a*, 25*a* and 26*a* and taper portions 27*a* and 28*a*, the major diameter portions being slidably fit in a through-hole 11*a* in the body 10*a*. The through-hole 11*a* has openings of a pair of load passages 13*a* and 14*a* connecting with an actuator 5*a* through a pair of conduits 6*a* and 7*a*, respectively, an entrance passage 15*a* connecting with the hydraulic pump 3*a* and an entrance passage 15*b* of the direction changeover valve 1*b*, first and second supply passages 16*a* and 17*a* located between the load passages 13*a* and 14*a* and the entrance passage 15*a*, and a pair of discharge passages 18*a* and 19*a* connecting with a tank 8. In the position as shown (hereinunder referred to as "neutral position"), the spool 12*a* shuts off the load passages 13*a* and 14*a* from the discharge passages 18*a* and 19*a*, and the first and second supply passages 16*a* and 17*a* from the entrance passage 15*a*, respectively, by its major diameter portions 20*a*, 23*a*, 21*a* and 22*a*.

When the spool 12*a* is moved leftwards from the neutral position to a position hereunder referred to as "first changeover position", the minor diameter portion 24*a* connects the load passage 13*a* to the discharge passage 18*a* and the minor diameter portion 26*a* connects the load passage 14*a* to the first supply passage 16*a*. Then, the taper portion 27*a* forms an iris responsive to movement of the spool 12*a* between the second supply passage 17*a* and the entrance passage 15*a*.

When the spool 12*a* is moved rightwards from the neutral position to a position hereinunder referred to "second changeover position", the minor diameter portion 26*a* connects the load passage 14*a* to the discharge passage 19*a* and the minor diameter portion 24*a* connects the load passage 13*a* to the first supply passage 16*a*. Then, the taper portion 28*a* forms an iris responsive to movement of the spool 12*a* between the second supply passage 17*a* and the supply passage 15*a*.

A peripheral groove 29*a* formed in the major diameter portion 22*a* serves to connect a pilot passage 30*a* formed in the main body 10*a* and opened to the through-hole 11*a* to the tank 8 when the spool 12*a* is in the neutral position and to disconnect the former from the latter when the spool is in the other positions. The first and second supply passages 16*a* and 17*a* have pilot passages 31*a* and 42, respectively, branching away therefrom.

A pressure compensation valve 33*a* includes a valve seat 34*a* disposed between the first and second supply passages 16*a* and 17*a*, a valve body 37*a* put in contact with the valve seat 34*a* to form a pilot chamber 35*a* and a spring 36*a* tensed in the pilot chamber 35*a* to urge the valve body 37*a*. The pilot chambers 35*a* and 35*b* of the pressure compensation valves 33*a* and 33*b* are connected through a pilot passage 39 and a high pressure selection passage 38 to either of the pilot passages 31*a* and 31*b*. The high pressure selection passage 38 has two inlets 38*a* and 38*b* connected to the pilot passages 31*a* and 31*b*, respectively, and an outlet 38*c* connected to the pilot passage 39 and serves to connect one of the pilot passages 31*a* and 31*b* having a higher fluid pressure to the pilot passage 39. Therefore, the pressure compensation valves 33*a* and 33*b* operate when the spools 12*a* and 12*b* of the direction changeover valves 1*a* and 1*b* are moved to the first or second changeover position, so that the higher one of the fluid pressures in the first supply passages 16*a* and 16*b* acts to both pilot chambers 35*a* and 35*b* to make the fluid pressures in the second supply passages 17*a* and 17*b* equal to respective sums of the fluid pressures in the pilot chambers 35*a* and 35*b* and the urging pressures of the springs 36*a* and 36*b*.

The hydraulic pump 3 of variable discharge type includes a regulator 3*b* and a hydraulic pump 3*d* and has its discharge port 3*e* connected through a pump passage 15 to the pressure reducing valve 4 disposed in the upstream of the composite valve 2. When the regulator 3*b* is in changeover position 3*n* as shown, a pressure chamber 3*c* of a control cylinder 3*a* of the hydraulic pump 3*d* is connected to the tank 8 and, therefore, a pressure at the discharge port 3*e* is kept at a minimum value by a spring force of the control cylinder 3*a*. The regulator 3*b* includes a spring chamber 3*f* having a spring 3*k* and connecting with a pilot passage PL1 for transmitting an oil pressure responsive to the output of the high pressure selection passage 38 of the composite valve 2, and a pressure chamber 3*g* connecting with the discharge port 3*e* of the hydraulic pump 3*d*, and serves to control the discharge pressure of the hydraulic pump 3*d* in accordance with a quantitative relationship between the urging forces of the spring chamber 3*f* and the pressure chamber 3*g*. The spring 3*k* of the regulator 3*b* is selected to be strong enough to compensate for a pressure loss produced at the maximum flow rate in the pump passage 15, as compared with a spring 4*b* of the pressure reducing valve 4.

When no hydraulic signal is transmitted through the pilot passage PL1 to the regulator 3*b*, the urging force of the spring chamber 3*f* is attributable only to the spring 3*k*. Therefore, if the discharge pressure of the hydraulic pump 3*d* exceeds the urging force of the spring 3*k*, the regulator 3*b* turns to another changeover position 3*m* to connect the pressure chamber 3*c* to the discharge port 3*e*. Thus, the discharge pressure acts to the pressure chamber 3*c* to stop increase of the discharge pressure of the hydraulic pump 3*b*. Accordingly, the discharge pressure of the hydraulic pump 3*d* is kept at a low value corresponding to the urging force of the spring 3*k* when no hydraulic pressure acts on the pilot passage PL1.

When an oil pressure acts in the pilot passage PL1, this pressure acts to the spring chamber 3*f* of the regulator 3*b* in addition to the urging force of the spring 3*k*. Accordingly, the discharge pressure of the hydraulic pump 3*d* is maintained at a value which is higher than the oil pressure in the pilot passage PL1 by a value corresponding to the urging force of the spring 3*k*.

The pressure reducing valve 4 disposed between the discharge port 3*e* of the hydraulic pump 3*d* and the entrance passage 15*b* of the composite valve 2 includes a spring chamber 4*a* having a spring 4*b* at an end thereof and connecting with the pilot passage PL1 and a pressure chamber 4*c* subjected to the oil pressure of the entrance passage 15*b* for opposing the spring chamber 4*a*, and has two change-over positions 4*n* and 4*m*. While the pressure reducing valve 4 is generally in the fully opened position 4*n*, it turns to the partially opened position 4*m*, when the pressure of the pressure chamber 4*c* exceeds the pressure of the spring chamber 4*a*, for keeping the pressure in the entrance passage 15*b* at a valve corresponding to the pressure of the spring chamber 4*a*. Thus, the oil pressure in the entrance passage 15*b* is kept at a value which is higher than the oil pressure in the pilot passage PL1 by a value corresponding to the urging force of the spring 4*b* of the spring chamber 4*a*.

The raised oil pressure in the entrance passage 15*a* is transmitted through the iris to the second supply passage 17*a* to open the pressure compensation valve 33*a*. Accordingly, the pressurized oil in the second supply passage 17*a* flows through the first supply passage 16*a* and the conduit 6*a* into the actuator 5*a* and the oil discharged from the actuator 5*a* flows through the conduit 7*a*, the load passage 14*a* and the discharge passage 19*a* into the tank 8 to initiate operation of the actuator 5*a*. At the same time, the oil pressure in the pressure chamber 35*a* of the pressure compensation chamber 33*a* acts as a load pressure of the actuator 5*a*.

In the above-mentioned operation, the pressure difference across the metering iris formed by the taper portion 28*a* of the spool 12*a* of the direction changeover valve 1*a* assumes a value corresponding to the urging force of the spring 4*b* of the spring chamber 4*a* of the pressure reducing valve 4. When the spool 12*a* is moved further rightwards, the aperture of the metering iris is increased and, therefore, the oil pressure in the entrance passage 15*a* is instantaneously reduced. However, this instantaneous reduction is transmitted to the pressure chamber 4*c* of the pressure reducing valve 4 to cause the pressure reducing valve 4 to supply the deficit of pressurized oil immediately. Thus, the oil pressure in the entrance passage 15*a* is recovered soon and maintained at a value corresponding to the urging force of the spring 4*b* of the pressure reducing valve 4.

It is obvious that a similar operation is effected to move the actuator 5*a* in the opposite direction when the spool 12*a* is moved leftwards, and it is also the case when only the other spool 12*b* is moved.

While the above description has been made on the case where only one of the direction changeover valves of the composite valve 2 is operated, a similar operation is effected also when both direction changeover valves 1*a* and 1*b* are operated concurrently. Now, the description will be made below about this case.

When the spools 12*a* and 12*b* of the direction changeover valves 1*a* and 1*b* are moved concurrently rightwards from the neutral position, the pilot passage 39 is first closed by displacement of the grooves 29*a* and 29*b* and, next, the load passages 13*a* and 13*b* are connected respectively to the first supply passages 16*a* and 16*b* through the minor diameter portions 24*a* and 24*b* to apply the load pressures of the actuators 5*a* and 5*b* to the first supply passages 16*a* and 16*b*, respectively. Then, higher one of the load pressures is applied through the pilot passage 31*a* or 31*b*, the high pressure selection passage 38 and the pilot passage 39 to the pressure chambers 35*a* and 35*b* of both pressure compensation valves 33*a* and 33*b*. Therefore, the output pressure of the hydraulic pump 3*d* increases in response to the oil pressure in the pilot passage PL1 and the pressure reducing valve 4 controls this output pressure and applies it to the supply passage 15*a*.

When both spools 12a and 12b are moved further rightwards, the taper portions 28a and 28b form metering irises between the entrance passages 15a and 15b and the second supply passages 17a and 17b, respectively. Therefore, the pressurized oils in the entrance passages 15a and 15b flow into the second supply passages 17a and 17b through these metering irises to apply the oil pressure through the pilot passage PL1 to the spring chamber 4a of the pressure reducing valve 4, thereby increasing the oil pressure in the pump passage 15 and the entrance passages 15a and 15b. When the oil pressure in the second supply passages 17a and 17b exceeds the pressure in the pressure chambers 35a and 35b of the pressure compensation valves 33a and 33b, it opens the pressure compensation valves 33a and 33b to flow the pressurized oil into the first supply passages 16a and 16b and then through the load passages 13a and 13b into the actuators 5a and 5b, respectively. The rate of flow at this time is kept at a value corresponding to the movement of the spool of each direction changeover valve, since the pressure difference across the metering iris of each direction changeover valve is kept in response to the urging force of the spring 4b of the pressure reducing valve 4.

In the above-mentioned operation, if one spool 12a, for example, is moved further rightwards to increase the aperture of its metering iris, the amount of oil flowing into the actuator 5a increases correspondingly to cause instantaneous reduction of the oil pressure in the entrance passages 15a and 15b. However, this pressure reduction is compensated by the pressure reducing valve 4 and the pressure difference across the iris is kept constant.

If the amount of oil required by the actuators 5a and 5b exceeds the amount of discharge of the hydraulic pump 3d upon movement of the spools 12a and 12b of the direction changeover valves 1a and 1b, the pressure compensation valves 33a and 33b confine the rate of flow from the second supply passages 17a and 17b to the first supply passages 16a and 16b to keep the oil pressure in the second supply passages 17a and 17b at the pressure of the spring chamber 4a of the pressure reducing valve 4. Accordingly, if the amount of discharge of the variable discharge hydraulic pump 3d becomes lacking with respect to the demand of the actuators 5a and 5b, the amount of flow to the actuators reduces concurrently. However, the rate of reduction corresponds to the aperture of the metering irises formed by the taper portions 28a and 28b of the spools 12a and 12b.

As described above, the pressure reducing valve disposed in the upstream of the composite valve keeps the oil pressure of the supply passages of the composite valve higher than the maximum load pressure of the actuators by a value corresponding to the urging force of the spring of the spring chamber. Thus, the piping resistance between the hydraulic pump and the composite valve can be avoided from affecting the flow rate control.

Figure 4:
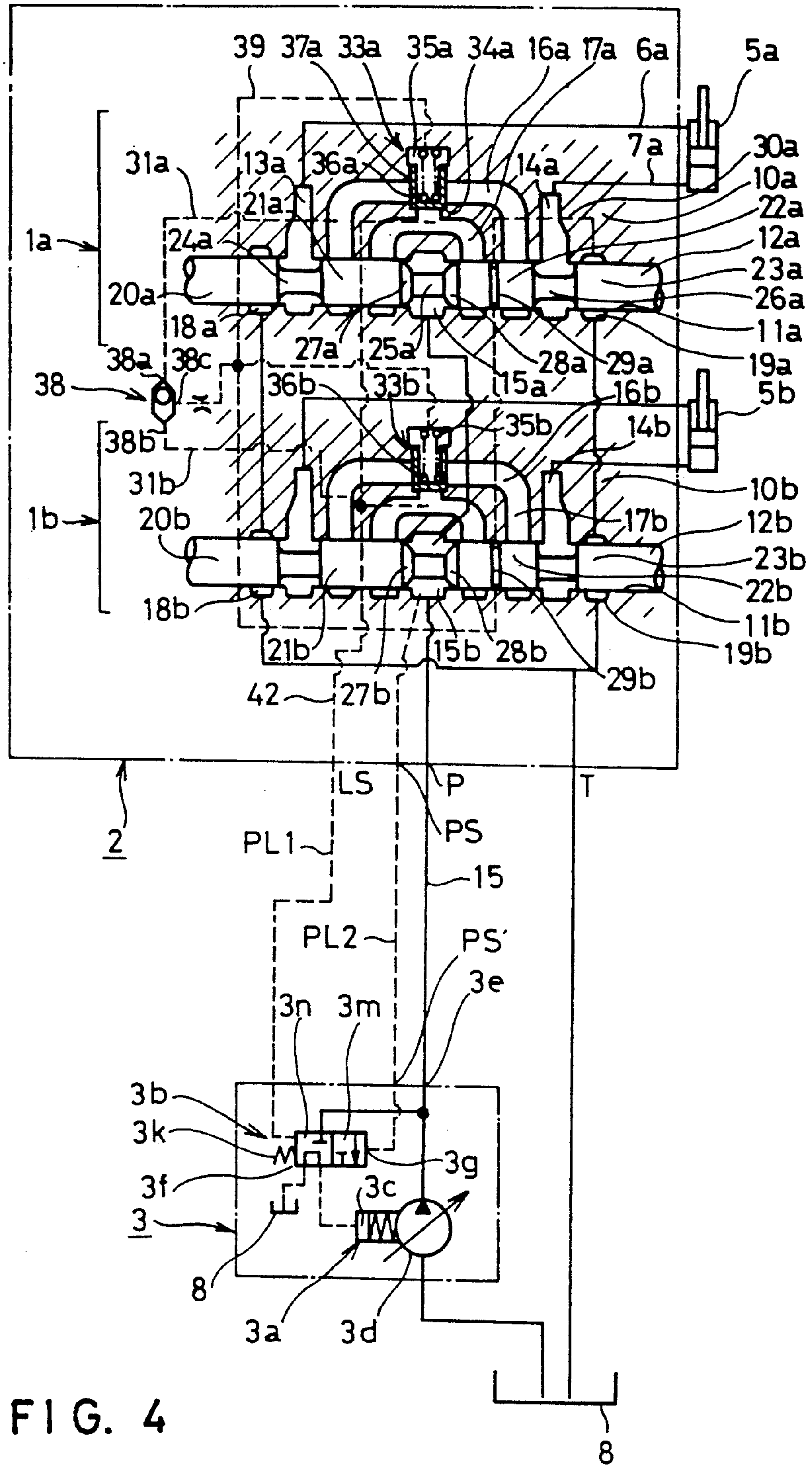
FIG. 4 is a schematic diagram showing another embodiment of the hydraulic circuit according to this invention.

FIG. 4 shows another embodiment of this invention, which differs from the above mentioned embodiment of FIG. 3 in that the pressure reducing valve is removed and, instead, another pilot passage is provided for leading the output pressure of the hydraulic pump acting on the pilot chambers of the regulators directly from the supply passages of the composite valve.

In the drawing, a composite valve 2 is provided with a port PS which enables to directly take out the pressure of the upstream of the metering iris of the spool 12a or 12b from the entrance passage 15a or 15b. On the other hand, the variable discharge hydraulic pump 3 is provided with a port PS' which enables to take the output pressure of the pump into the pressure chamber 3g of the regulator 3b which is opposed to the spring chamber 3f thereof from the outside. Then, the port PS of the composite valve 2 and the port PS' of the pump 3 are connected through a pilot passage PL2.

In operation, the downstream pressure of the metering irises formed by the spools 12a and 12b of the composite valve 2 is transmitted through the second supply passage 17a or 17b to the port LS to act directly to the spring chamber 3f of the regulator 3b through the pilot passage PL1. On the other hand, the upstream pressure of the metering iris is transmitted from the supply circuit 15a or 15b to the port PS to act directly to the pressure chamber 3g of the regulator 3b through the pilot passage PL2. For example, when the aperture of the metering iris formed by the spool 12a increases, the pressure difference across the iris tends to decrease. However, the regulator 3b actuates the control cylinder 3a of the hydraulic pump 3 to increase its amount of discharge so that the pressure difference corresponds to the urging force of the spring 3k. Therefore, the controlled rate of flow becomes to have a value corresponding to the movement of the spool of each direction changeover valve. Thus, influence of the pressure loss in the pump passage 15 can be fully avoided by only adding the thin pilot passage PL2 between the hydraulic pump 3 and the composite valve 2.

The above embodiments are provided for illustrative purpose only and do not limit the invention. It should be obvious for those skilled in the art that various modifications and changes can be added to the embodiments without leaving the scope of invention which is defined in the appended claims.

We claim:

1. A hydraulic circuit comprising a hydraulic pump of variable discharge type provided with a regulator, and a composite valve having an inlet connected to the outlet of said hydraulic pump and outlets connected respectively to actuators to be driven and including a plurality of direction changeover valves each having a spool for controlling direction and flow rate of pressurized oil supplied to each of said actuators, each of said direction changeover valves including an entrance passage connected to the inlet of said composite valve, a first supply passage connected to said actuator as a result of movement of said spool, a metering iris having an aperture which varies with movement of said spool, a second supply passage connected to said entrance passage through said metering iris, and a pressure compensation valve having a pressure chamber between said first and second supply passages, said composite valve further comprising high pressure selecting means having inlets connected respectively to the first supply passages of said direction changeover valves and an outlet connected to the pressure chambers of said pressure compensation valves for selecting and applying a highest pressure of said first supply passages to said pressure chambers, and means for applying a pressure depending upon said highest pressure to the regulator of said hydraulic pump;

wherein said hydraulic circuit further comprises a pressure reducing valve connected between the outlet of said hydraulic pump and the inlet of said composite valve and provided with a spring chamber and a pressure chamber, means for applying an oil pressure of said spring chamber to the regulator of said hydraulic pump, and means for applying an oil pressure of the inlet of said composite valve to the pressure chamber of said pressure reducing valve, said pressure reducing valve having only a fully opened position and a partially opened position, and urging force of a spring included in said spring chamber having a value compensating for a pressure difference across said metering iris, and an urging force of a spring included in a spring chamber of said regulator having a value higher than said urging force of said spring in the spring chamber of said pressure reducing valve by a pressure loss across a piping between said hydraulic pump and said composite valve.

* * * * *